United States Patent [19]
Hayashi

[11] Patent Number: 5,347,405
[45] Date of Patent: Sep. 13, 1994

[54] MAGNETIC RECORDING CORRECTION CIRCUIT FOR REDUCING INTERFERENCE WAVES BY THIRD-DEGREE INTER-MODULATION DISTORTIONS

[75] Inventor: Naoto Hayashi, Yokohama, Japan

[73] Assignee: Victor Company of Japan, Ltd., Yokohama, Japan

[21] Appl. No.: 841,024

[22] Filed: Feb. 25, 1992

[30] Foreign Application Priority Data

Feb. 27, 1991 [JP] Japan .................. 3-055982

[51] Int. Cl.$^5$ .................. G11B 5/02; F16M 13/00
[52] U.S. Cl. .................. 360/30; 360/20; 360/19.1; 348/608
[58] Field of Search .................. 360/30, 29, 19.1; 358/144, 26, 55, 330; 369/86; 332/133, 170; 381/97, 119; 307/529; 308/328, 340; 348/608

[56] References Cited

U.S. PATENT DOCUMENTS

| | | | |
|---|---|---|---|
| 2,605,395 | 7/1982 | Cheek | 332/170 |
| 3,475,626 | 10/1969 | Holzman et al. | 307/529 |
| 4,322,746 | 3/1992 | Ogunio | 360/20 X |
| 4,477,840 | 10/1984 | Kluth | 358/330 |
| 5,027,222 | 6/1991 | Shimbo et al. | 360/19.1 X |
| 5,036,408 | 7/1991 | Leis et al. | 360/77.05 |
| 5,111,346 | 5/1992 | Matsuka | 360/19.1 |
| 5,200,864 | 4/1993 | Dumar et al. | 360/20 X |

FOREIGN PATENT DOCUMENTS 1478339  6/1977  United Kingdom ......... G11B 5/197

OTHER PUBLICATIONS

"Television Multichannel Sound Broadcasting", Eilers & Fockens, 1981 pp. 396–408.

Primary Examiner—Donald Hajec
Assistant Examiner—Le Thien Minh
Attorney, Agent, or Firm—Jacobson, Price, Holman & Stern

[57] ABSTRACT

A magnetic recording correction circuit for a video tape recorder comprises a first multiplier supplied with a first signal to output a signal having a frequency which is twice as high as that of the first signal; a second multiplier supplied with a second signal and a first multiplier output signal outputted from the first multiplier to output a correction signal having a component of a sum frequency of the second signal and the first multiplier output signal and a component of a difference frequency therebetween; an adding circuit for adding the first and second signals and the correction signal; and a phase shifter provided on the output side of the second multiplier to exert a phase characteristic on the correction signal with respect to the first and second signals.

5 Claims, 2 Drawing Sheets

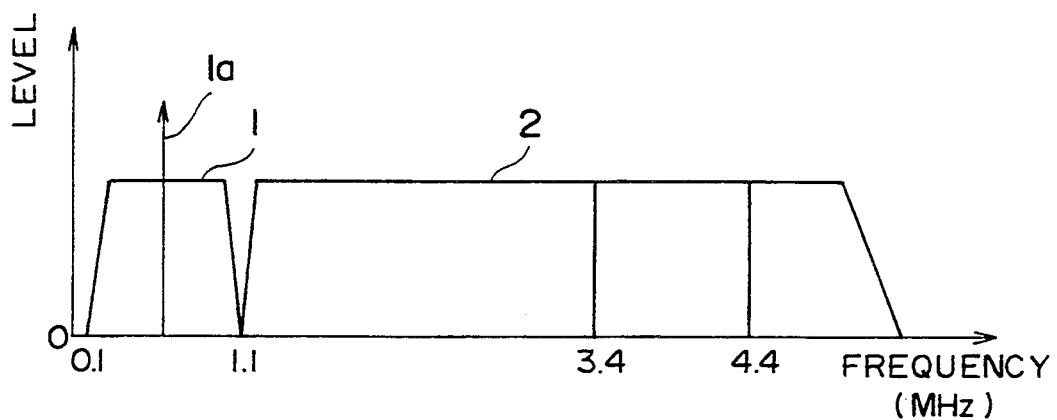
FIG. IA PRIOR ART
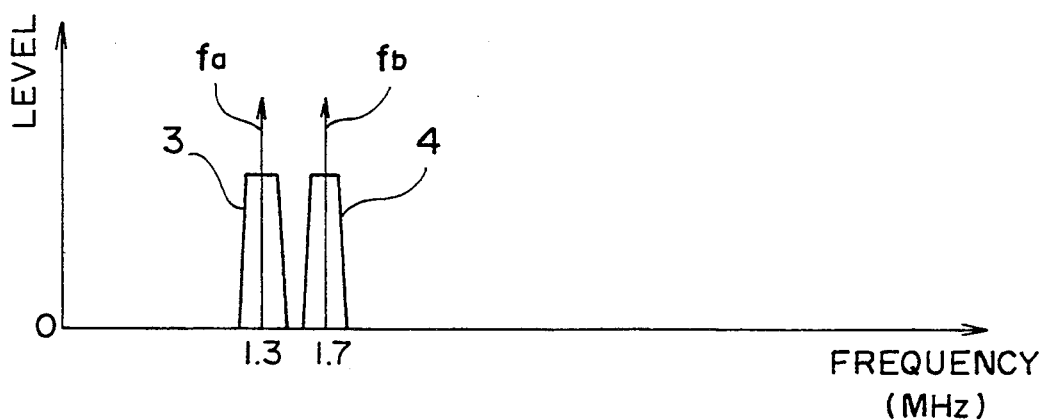
FIG. IB PRIOR ART

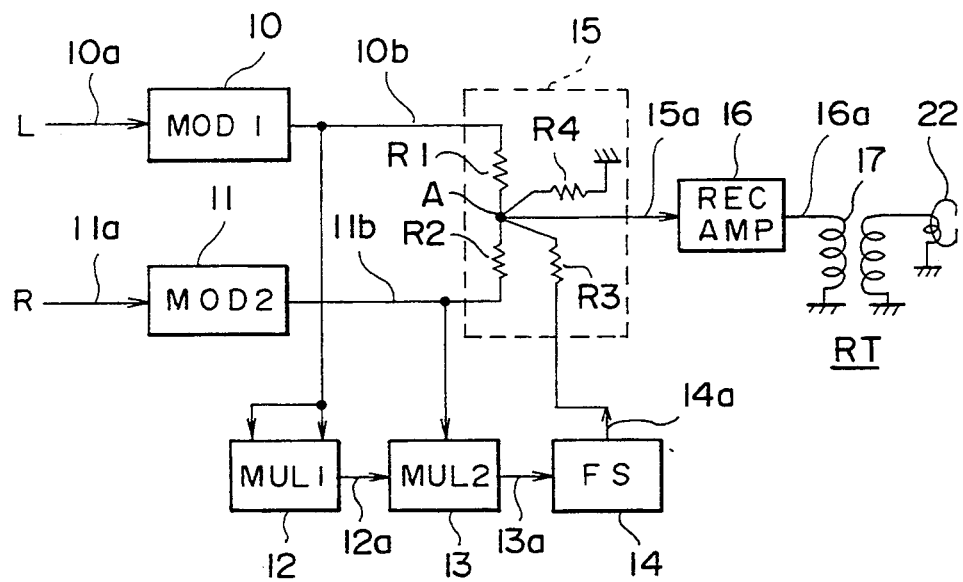
F I G. 2
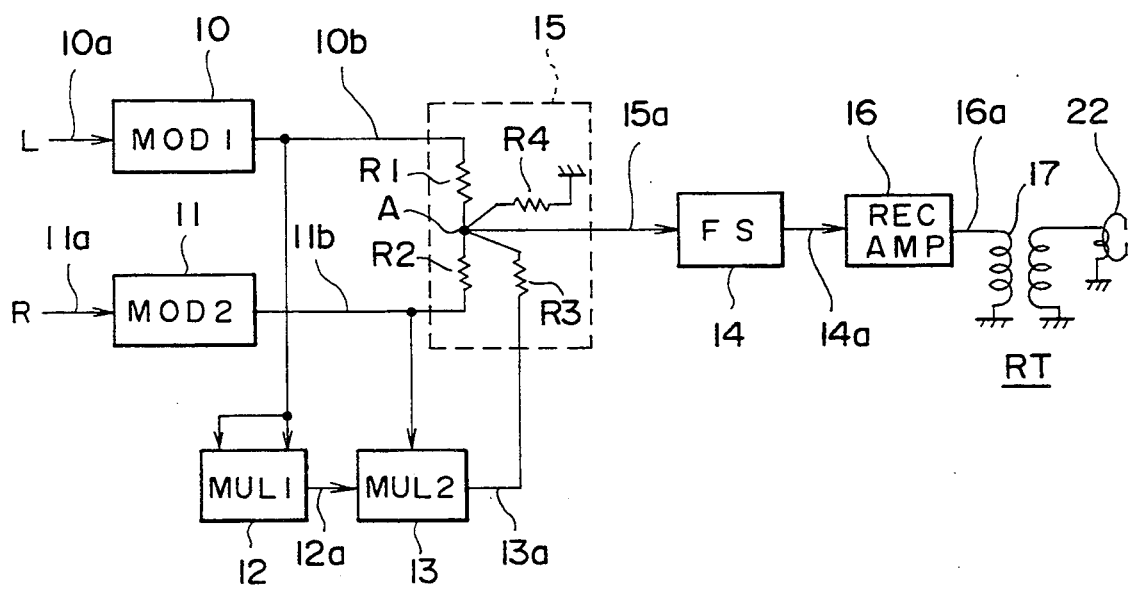
F I G. 3

MAGNETIC RECORDING CORRECTION CIRCUIT FOR REDUCING INTERFERENCE WAVES BY THIRD-DEGREE INTER-MODULATION DISTORTIONS

BACKGROUND OF THE INVENTION

This invention relates to a magnetic recording correction circuit for a video tape recorder, and more particularly, to a correction circuit capable of reducing an interference wave due to the third-degree inter-modulation (cross modulation) distortion accompanying recording/playback of an information signal.

FIGS. 1A and 1B show the frequency allocation by the prior art. With reference to these diagrams on occasion, the prior art will now be described.

In the Video Home System (VHS) standard which is one system of a home Video Tape Recorder (VTR), a frequency modulated (FM) luminance signal and a low-frequency band chrominance signal are frequency-multiplexed. The signal thus multiplexed is recorded on the surface layer portion of a magnetic tape by means of a first magnetic head. The above-mentioned FM luminance signal is provided by frequency-modulating a carrier with a luminance signal, and the above-mentioned low frequency band chrominance signal is provided by converting a chrominance signal to signal components in a low frequency band. In the above-described VHS standard, a first frequency-modulated (FM) audio signal and a second frequency-modulated (FM) audio signal are frequency-multiplexed. The signal thus multiplexed is recorded at the deep layer portion of the magnetic tape by means of a second magnetic head. The above-mentioned first and second FM audio signals are provided by frequency-modulating carriers with audio signals of two channels, respectively. Further, there is employed a configuration such that the second magnetic head is precedent to the first magnetic head, and is adapted to scan the same track as that of the first magnetic head with these magnetic heads having azimuth angles different from each other.

Usually, each of the video signal (FM luminance signal and low-frequency band chrominance signal) and the multiplexed FM audio signal is recorded and reproduced by a pair of magnetic heads having mutually opposite azimuth angles alternately track by track. But it is not a substantial matter for the present invention, and only one head for each is illustrated or explained in this specification.

FIG. 1A shows the frequency allocation of a signal recorded by the first magnetic head wherein reference numeral 1 represents an occupied frequency band of the low frequency band chrominance signal, reference numeral 2 represents an occupied frequency band of a FM luminance signal, and reference numeral 1a represents a carrier frequency (0.629 MHz) of the low frequency band chrominance signal. Further, FIG. 1B shows the frequency allocation of audio signals recorded by the second magnetic head wherein reference numeral 3 represents an occupied frequency band of a first FM audio signal, reference numeral 4 represents an occupied frequency band of a second audio signal, fa represents a carrier frequency (1.3 MHz) of the first FM audio signal, and fb represents a carrier frequency (1.7 MHz) of the second FM audio signal.

Meanwhile, it is known in the magnetic recording/reproduction that when two signals having carrier frequencies different from each other are simultaneously recorded and reproduced, a third-degree inter-modulation distortion would take place by the non-linearlity occuring in the process of the magnetic recording/reproduction. On the basis of such a characteristic, between the first FM audio signal (1.3 MHz) and the second FM audio signal (1.7 MHz), there take place six third-degree inter-modulation distortions of "3.9 (=1.3×3) MHz", "0.9 (=1.3×2−1.7) MHz", "4.3 (=1.3×2+1.7) MHz", "2.1 (=1.7×2−1.3) MHz", "4.7 (=1.7×2+1.3) MHz", and "5.1 (=1.7×3) MHz". Such third-degree inter-modulation distortions are reproduced by the first magnetic head, but most thereof do not cause interference owing to the azimuth angle loss.

However, the lowest frequency component "0.9 (=1.3×2−1.7) MHz" is of problem because its azimuth angle loss is small. Namely, as shown in FIG. 1A, since the occupied frequency band 1 of the low frequency band chrominance signal exists from "0.1 MHz" to "1.1 MHz", the frequency component of "0.9 MHz" becomes an interference wave with respect to the low frequency band chrominance signal. As a result, there is the problem that in the case where such a signal is demodulated, an oblique stripe pattern appears on the entirety of a picture.

With a view of avoiding such a problem, in the prior art, an approach was employed to shift recording currents of the first and second FM audio signals recorded by the second magnetic head from an optimum value to thereby lower the recording level of the frequency component of "0.9 MHz" which is the above-mentioned third-degree inter-modulation distortion to hold down the level of an interference wave reproduced by the first magnetic head to a lower level, thus to cope with this problem.

In accordance with the above-described prior art, since the recording current of the second magnetic head is shifted from the optimum value, the regenerative level of the FM audio signal is lowered. For this reason, there was the problem that S/N of the reproduced audio signal is lowered.

Further, even if the recording current of the second magnetic head is shifted from the optimum value, because the recording efficiency depends upon the depth of the gap of the magnetic head, the recording efficiency is increased by abrasion or wear of the second magnetic head. As a result, reduction in the recording level of the lowest frequency of the third-degree inter-modulation distortion by reduction of the recording current of the second magnetic head is canceled. Thus, there results the state equivalent to the state where that level is not reduced. For this reason, there also was the problem that an oblique stripe pattern might appear on a picture.

SUMMARY OF THE INVENTION

An object of this invention is to provide a magnetic recording correction circuit capable of reducing an interference wave by the third-degree inter-modulation distortion due to the non-linearlity of the magnetic recording and reproduction, and of setting the recording current of the second magnetic head to an optimum value, thus to improve S/N of the FM audio signal.

To achieve the above-object, a magnetic recording correction circuit according to this invention comprises a first multiplier supplied with a first signal to output a signal having a frequency which is twice as high as that of the first signal; a second multiplier supplied with a second signal and the first multiplier output signal outputted from the first multiplier to output a correction signal having a component of a sum frequency of the second signal and the first multiplier output signal and a component of a difference frequency therebetween; an adding circuit for adding the first signal, the second signal, and the correction signal; and a phase shifter provided on the output side of the second multiplier to exert a phase characteristic on the correction signal with respect to the first and second signals.

In accordance with the magnetic recording correction circuit according to this invention thus constructed, it is possible to remarkably reduce an interference wave by the third-degree inter-modulation distortion due to the non-linearlity of recording and reproduction. For this reason, in the case where this invention is applied in recording audio signals of two channels in a home video tape recorder adapted to frequency-multiplex an FM luminance signal and a low frequency chrominance signal to record the signal thus multiplexed by means of a first magnetic head, and to frequency-multiplex two FM audio signals provided by frequency-modulating audio signals of two channels to record the signal thus multiplexed by means of a second magnetic head, the following excellent advantages are provided: Namely, the recording current of the second magnetic head can be set to an optimum value; a high quality reproduced audio signal of good S/N can be provided; and an oblique stripe pattern appearing on the entirety of a picture, thus making it possible to provide a high quality or definition video signal as well.

BRIEF DESCRIPTION OF THE DRAWINGS

In the accompanying drawings:

FIGS. 1A and 1B are diagrams showing the frequency allocation by the prior art;

FIG. 2 is a block diagram showing the outline of the configuration of a magnetic recording correction circuit according to a first embodiment of this invention; and FIG. 3 is a block diagram showing the outline of the configuration of a magnetic recording correction circuit according to a second embodiment of this invention.

DETAILED DESCRIPTION OF THE PREFERRED EMBODIMENTS

Preferred embodiments of a magnetic recording correction circuit according to this invention will now be described in detail with reference to the attached drawings.

Initially, in the block diagram of FIG. 2 showing the outline of the configuration of a first embodiment according to this invention, reference numerals 10 and 11 denote first and second frequency modulators (MOD1 and MOD2), respectively; reference numerals 10a and 11a audio signals of the L-channel and the R-channel, respectively; reference numerals 10b and 11b first and second FM audio signals, respectively; reference numerals 12 and 13 first and second multipliers (MUL1 and MUL2), respectively; reference numeral 12a a first multiplier output signal; reference numeral 13a a correction signal; reference numeral 14 a phase shifter (FS); reference numeral 14a a phase shifter output signal; reference numeral 15 an adding circuit; reference numeral 15a an adding circuit output signal; R1, R2, R3 and R4 resistors, respectively; A a junction; reference numeral 16 a recording amplifier (REC AMP.); reference numeral 17 a rotary transformer (RT); and reference numeral 22 a second magnetic head. In this embodiment, the above-mentioned adding circuit 15 is constituted by the resistors R1, R2, R3 and R4 and the junction A of these resistors.

The flow of signals will now be described. By an audio signal supply circuit (not shown), an audio signal 10a of the L-channel and an audio signal 11a of the R-channel are supplied to the input sides of the first and second frequency modulators 10 and 11, respectively. These first and second frequency modulators 10 and 11 carry out predetermined frequency modulations, respectively. Thus, the first frequency modulator 10 outputs a first FM audio signal 10b having a carrier frequency of 1.3 MHz (fa) in the state of low impedance. Further, the second frequency modulator 11 outputs the second FM audio signal 11b having a carrier frequency of 1.7 MHz (fb) in the state of low impedance.

The first FM audio signal 10b is delivered to one end of the resistor R1 the other end of which is connected to the junction A, and is also delivered to two input sides of the first multiplier 12. The first multiplier 12 is comprised of, e.g., a balanced modulator. A first multiplier output signal 12a having a carrier frequency (2.6 MHz) which is twice as high as that of the first FM audio signal 10b is outputted from the first multiplier 12. This signal is delivered to one input side of the second multiplier 13.

On the other hand, the second FM audio signal 11b is delivered to one end of the resistor R2 the other end of which is connected to the junction A, and is delivered also to the other input side of the second multiplier 13. The second multiplier 13 is comprised of, e.g., a balanced modulator. The second multiplier 13 delivers, to the input side of the phase shifter 14, a correction signal 13a (carrier frequency 2.6±1.7 MHz) in which a component having the sum frequency of the first multiplier output signal 12a (carrier frequency 2.6 MHz) and the second FM audio signal 11b (carrier frequency 1.7 MHz) and a component having the difference frequency therebetween are included.

The phase shifter 14 corrects the phase characteristic of the correction signal 13a added to an added signal of the first FM audio signal 10b and the second FM audio signal 11b delivered to the adding circuit 15. Namely, by phase-shifting, by predetermined quantities, the correction signal 13a is to correct rates of changes of the phase characteristic at the frequencies 0.9 (=2.6−1.7) MHz, 1.3 MHz (fa) and 1.7 MHz (fb) occuring at recording amplifier circuit 16 and rotary transformer 17 which will be described later, and having such a level of an opposites polarity to cancel the lowest frequency component of the third-degree inter-modulation distortion occuring when the above-described magnetic recording is carried out, and so a phase shifter output signal 14a is provided. This phase shifter output signal 14a is delivered in the state of low impedance to one end of the resistor R3 the other end of which is connected to the junction A at the adding circuit 15.

The adding circuit 15 comprises, as previously described, resistors R1, R2 and R3 having one ends connected to the junction A and the other ends respectively connected to the first frequency modulator 10, the second frequency modulator 11 and the phase shifter 14, and a resistor R4 having one end connected to the junction A and the other end which is grounded. At the junction A of the adding circuit 15, the first FM audio signal 10b, the second FM audio signal 11b, and the phase shifter output signal 14a (carrier frequency 2.6± 1.7 MHz) are added. As a result, an adding circuit output signal 15a is delivered to the recording amplifier 16 of which input side is connected to the junction A.

Further, the recording amplifier 16 amplifies the adding circuit output signal 15a with a predetermined frequency characteristic to obtain a recording current 16a. The recording current 16a adjusted to an optimum value in this way is delivered to one end of the primary side input of the rotary transformer 17 the other end of which is grounded. Since one end of the secondary side input of the rotary transformer 17 is grounded, but the other end thereof is connected to the magnetic head 22, there is induced a current corresponding to the recording current 16a on the other end of the transformer 17, and is then delivered to the second magnetic head 22. The second magnetic head 22 is provided on a rotary drum (not shown), and has one end grounded and the other end supplied with the recording signal including the correction signal. By using the second magnetic head 22, information based on this recording signal is recorded onto a magnetic tape (not shown).

In this way, in order to cancel in advance an expected interference wave, the first FM audio signal 10b, the second FM audio signal 11b, and the phase shifter output signal 14a are superposed. The signal thus superposed is recorded by means of the second magnetic head. By carrying out recording in this way, it is possible to completely hold down the lowest frequency component of the third-degree inter-modulation distortion at the time of reproduction which component is unavoidable in the magnetic recording and has a small azimuth loss by the first magnetic head.

Accordingly, since the recording current 16a can be set to an optimum value, a high quality reproduced audio signal of good S/N can be provided. Further, since an oblique stripe pattern appearing on the entirety of the screen can be prevented, a high quality video signal can be provided as well.

It is to be noted that not only the lowest frequency component of the third-degree inter-modulation distortion indicated by a difference between the first and second FM audio signals 10b and 11b but also the frequency component indicated by the sum of the both audio signals are included in the phase shifter output signal 14a, such frequency components are eliminated at the same time.

It is a matter of course that an approach may be adopted to replace at least one of resistors R1 to R4 by a single variable resistor, thus making it possible to adjust the ratio of addition.

Furthermore, it is to be noted that while the adding circuit 15 is comprised of resistors, this invention is not limited to such an implementation. For example, such an adding circuit may be implemented by using active elements.

Further, it is a matter of course that the adjustment of the recording current 16a may be carried out by changing the output levels of the first and second frequency modulators 10 and 11.

Furthermore, since the phase shifter 14 corrects the rates of changes of the phase characteristic (group delay times) occurring at the recording amplifier circuit 16 and the rotary transformer 17, it may be provided at any portion in a signal recording path from the output side of the multiplier 13 to the magnetic head 22. For example, as shown in FIG. 3, an approach may be employed to disconnect input/output terminals of the phase shifter 14, and to directly connect the output side of the multiplier 13 and the side which is not connected to the junction A of the resistor R3, thus to insert the phase shifter 14 between the junction A and the recording amplifier circuit 16.

It is to be noted that an interference wave is produced by the inter-modulation distortion of a signal having two frequency components due to the non-linearlity of the magnetic recording and reproducing operation, it is not limited that the recording signal is in the form of a frequency modulated (FM) signal. For example, such recording signal may be in the form of amplitude-modulated (AM), pulse-modulated (PM), or digitally modulated signal, etc. For the digital modulation, there are the phase shift keying (PSK) modulation, the M2 modulation, the 8 to 10 modulation, etc. Accordingly, it is a matter of course that the first and second frequency modulators 10 and 11 may be a merely signal supply circuit.

What is claimed is:

1. A magnetic recording correction circuit for a video recorder comprising:
   a first signal supply circuit for outputting a first signal having a predetermined frequency;
   a first multiplier supplied with said first signal to output a first multiplied signal having a frequency which is twice as high as that of said first signal;
   a second signal supply circuit for outputting a second signal;
   a second multiplier supplied with said second signal and said first multiplied signal output by said first multiplier to output a correction signal having a component of a sum frequency of said first multiplied signal and said second signal and a component of a difference frequency therebetween;
   an adding circuit for adding said first signal, said second signal, and said correction signal; and
   a phase shifter provided at least on the output side of said second multiplier to impose a phase characteristic on said correction signal with respect to said first and second signals, thereby removing a third-degree inter-modulation distortion occurring between said first and second signals.

2. A correction circuit as set forth in claim 1, wherein said first and second signals, which are generated in said first signal supply circuit and said second signal supply circuit, respectively, are first and second frequency-modulated audio signals having carrier frequencies different from each other.

3. A magnetic recording correction circuit for a video recorder, comprising:
   a first multiplier which receives a first frequency-modulated audio signal having a first carrier frequency, and outputs a first multiplied signal having a first frequency which is twice as high as said first carrier frequency of said first frequency-modulated audio signal;
   a second multiplier which receives a second frequency-modulated audio signal having a second carrier frequency which differs from said first carrier frequency, and outputs a correction signal having a component of a sum frequency of said first multiplied signal and said second frequency-modulated signal and a component of difference frequency therebetween;
   an adding circuit for adding said first frequency-modulated audio signal, said second frequency-modulated audio signal, and said correction signal; and a phase shifter provided on the output side of said second multiplier to impose a phase characteristic on said correction signal with respect to said first and second frequency-modulated audio signals, thereby removing a third-degree inter-modulation distortion occurring between said first and second frequency-modulated audio signals;

wherein said adding circuit is comprised of a plurality of resistors and adds the first and second frequency-modulated audio signals with the correction signal which is output by said phase shifter.

4. A magnetic recording correction circuit for a video recorder, comprising:

a first multiplier which receives a first frequency-modulated audio signal having a first carrier frequency, and outputs a first multiplied signal having a first frequency which is twice as high as said first carrier frequency of said first frequency-modulated audio signal;

a second multiplier which receives a second frequency-modulated audio signal having a second carrier frequency which differs from said first carrier frequency, and outputs a correction signal having a component of a sum frequency of said first multiplied signal and said second frequency-modulated signal and a component of difference frequency therebetween;

an adding circuit for adding said first frequency-modulated audio signal, said second frequency-modulated audio signal, and said correction signal; and a phase shifter provided on the output side of said second multiplier to impose a phase characteristic on said correction signal with respect to said first and second frequency modulated audio signals, thereby removing a third-degree inter-modulation distortion occurring between said first and second frequency-modulated audio signals;

wherein said adding circuit is comprised of a plurality of resistors and adds the first and second frequency-modulated signals with the correction signal and the resulting sum is the signal being supplied to said phase shifter.

5. A magnetic recording correction circuit for a video recorder, comprising:

delay circuit means for generating a third-degree inter-modulation magnetic distortion component between first and second frequency-modulated audio signals, the delay circuit means comprising:

a first multiplier which receives a first frequency-modulated audio signal at a first carrier frequency and outputs a first multiplied signal having a first frequency which is twice the first carrier frequency;

a second multiplier which receives a second frequency-modulated audio signal at a second carrier frequency different from said first carrier frequency, and which outputs a correction signal having a component of a sum frequency of said first multiplied signal and said second frequency-modulated signal and a component of a difference therebetween;

an adding circuit for adding the first frequency-modulated signal, the second frequency-modulated signal and said correction signal; and a delay element connected to an output side of the second multiplier to delay said correction signal with respect to the first and second frequency-modulated signals.

* * * * *